United States Patent
Lenrow et al.

(10) Patent No.: US 12,255,875 B2
(45) Date of Patent: Mar. 18, 2025

(54) SIDECAR PROXY AS A SERVICE

(71) Applicant: VERIZON PATENT AND LICENSING INC., Basking Ridge, NJ (US)

(72) Inventors: David Robert Lenrow, Lexington, MA (US); Myron Eugene Bagwell, Southlake, TX (US); Vinod Kumar Choyi, Conshohocken, PA (US); Michael A Gallagher, Dublin, OH (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 497 days.

(21) Appl. No.: 17/400,173

(22) Filed: Aug. 12, 2021

(65) Prior Publication Data

US 2023/0047880 A1    Feb. 16, 2023

(51) Int. Cl.
| | |
|---|---|
| *H04L 9/40* | (2022.01) |
| *G06F 9/455* | (2018.01) |
| *H04L 41/0806* | (2022.01) |
| *H04L 41/0893* | (2022.01) |

(52) U.S. Cl.
CPC ...... *H04L 63/0281* (2013.01); *G06F 9/45558* (2013.01); *H04L 41/0806* (2013.01); *H04L 41/0893* (2013.01); *H04L 63/20* (2013.01); *G06F 2009/45595* (2013.01)

(58) Field of Classification Search
CPC ............. H04L 63/0281; H04L 41/0806; H04L 41/0893; H04L 63/20; G06F 9/45558; G06F 2009/45595
USPC .......................................................... 726/12
See application file for complete search history.

(56) References Cited

U.S. PATENT DOCUMENTS

| | | | |
|---|---|---|---|
| 11,323,418 B2* | 5/2022 | Barton | H04L 41/0816 |
| 11,375,527 B1* | 6/2022 | Eyuboglu | H04B 7/15528 |
| 11,567,841 B1* | 1/2023 | Balasubramanian | G06F 11/2028 |

(Continued)

FOREIGN PATENT DOCUMENTS

| | | | | |
|---|---|---|---|---|
| CN | 112182641 A | * | 1/2021 | |
| CN | 113296927 A | * | 8/2021 | G06F 9/5072 |

(Continued)

OTHER PUBLICATIONS

Tan et al., "Research on a Lightweight Service Mesh Architecture Using eBPF," 2023 4th International Conference on Computer Engineering and Application (ICCEA), Hangzhou, China, 2023, pp. 52-55, doi: 10.1109/ICCEA58433.2023.10135394. (Year: 2023).*

(Continued)

*Primary Examiner* — Peter C Shaw

(57) ABSTRACT

Disclosed are embodiments for injecting sidecar proxy capabilities into non-sidecar applications, allowing such non-sidecar applications to communicate with a service mesh architecture. In an embodiment, a method comprises receiving a request to instantiate a proxy for a non-sidecar application at a service mesh gateway (SMG). The SMG then instantiates the proxy in response to the request and broadcasts network information of the non-sidecar application to a mesh controller deployed in a containerized environment. Finally, the SMG (via the proxy) transmits data over a control plane that is communicatively coupled to the mesh controller.

20 Claims, 9 Drawing Sheets

(56) References Cited

U.S. PATENT DOCUMENTS

| | | | | |
|---|---|---|---|---|
| 2015/0341874 | A1* | 11/2015 | Nguyen-Dang | H04W 52/0222 370/350 |
| 2019/0042515 | A1* | 2/2019 | Guim Bernat | G06N 3/045 |
| 2022/0019454 | A1* | 1/2022 | Desai | G06F 9/547 |
| 2022/0070279 | A1* | 3/2022 | Pang | H04L 67/133 |
| 2022/0104100 | A1* | 3/2022 | M | H04W 84/18 |
| 2022/0116445 | A1* | 4/2022 | Filippou | H04L 41/0853 |
| 2022/0247725 | A1* | 8/2022 | Panchamia | H04L 12/4633 |
| 2022/0329505 | A1* | 10/2022 | Malhotra | H04L 43/0811 |
| 2022/0342707 | A1* | 10/2022 | Alagna | H04L 67/1008 |
| 2023/0236909 | A1* | 7/2023 | Zhang | G06F 9/5027 718/100 |

FOREIGN PATENT DOCUMENTS

| | | | | |
|---|---|---|---|---|
| WO | WO-2007025818 | A1 * | 3/2007 | H04L 12/18 |
| WO | WO-2022090768 | A1 * | 5/2022 | H04L 41/0816 |
| WO | WO-2022160141 | A1 * | 8/2022 | H04L 41/046 |

OTHER PUBLICATIONS

Koschel et al., "A Look at Service Meshes," 2021 12th International Conference on Information, Intelligence, Systems & Applications (IISA), Chania Crete, Greece, 2021, pp. 1-8, doi: 10.1109/IISA52424.2021.9555536. (Year: 2021).*

Ganguli et al., "Challenges and Opportunities in Performance Benchmarking of Service Mesh for the Edge," 2021 IEEE International Conference on Edge Computing (EDGE), Chicago, IL, USA, 2021, pp. 78-85, doi: 10.1109/EDGE53862.2021.00020. (Year: 2021).*

Lin et al., "PhysarumSM: P2P Service Discovery and Allocation in Dynamic Edge Networks," 2021 IFIP/IEEE International Symposium on Integrated Network Management (IM), Bordeaux, France, 2021, pp. 304-312. (Year: 2021).*

Duong et al., "A Design of Service Mesh Based 5G Core Network Using Cilium," 2023 International Conference on Information Networking (ICOIN), Bangkok, Thailand, 2023, pp. 25-28, doi: 10.1109/ICOIN56518.2023.10049044. (Year: 2023).*

Yang et al., "Service Discovery Based Blue-Green Deployment Technique in Cloud Native Environments," 2018 IEEE International Conference on Services Computing (SCC), San Francisco, CA, USA, 2018, pp. 185-192, doi: 10.1109/SCC.2018.00031. (Year: 2018).*

Sahu et al. "Sidecars on the Central Lane: Impact of Network Proxies on Microservices," arXiv:2306.1579, Jun. 27, 2023. (Year: 2023).*

Kalubowila et al., "Optimization of Microservices Security," 2021 3rd International Conference on Advancements in Computing (ICAC), Colombo, Sri Lanka, 2021, pp. 49-54, doi: 10.1109/ICAC54203.2021.9671131. (Year: 2021).*

Kuy et al., "Managing and Orchestrating Cross-Cloud VNFs with Deployable Sidecar VNF Coordinators," 2024 IEEE 10th International Conference on Network Softwarization (NetSoft), Saint Louis, MO, USA, 2024, pp. 61-66, doi: 10.1109/NetSoft60951.2024.10588900. (Year: 2024).*

* cited by examiner

SIDECAR PROXY AS A SERVICE

BACKGROUND INFORMATION

Containerized systems can include universal network proxy capabilities that are injected between the server workloads and the server network interfaces. Such proxies have access to all of the network traffic that goes to and from the workloads. In a service mesh architecture, such proxies can form part of a dedicated infrastructure layer and be applied liberally to all containers without modification of the underlying containerized applications. However, applications executing directly on server hardware or in virtual machines are not amenable to the injection of proxies and instead require manual configuration in current approaches.

DETAILED DESCRIPTION

Figure 1:
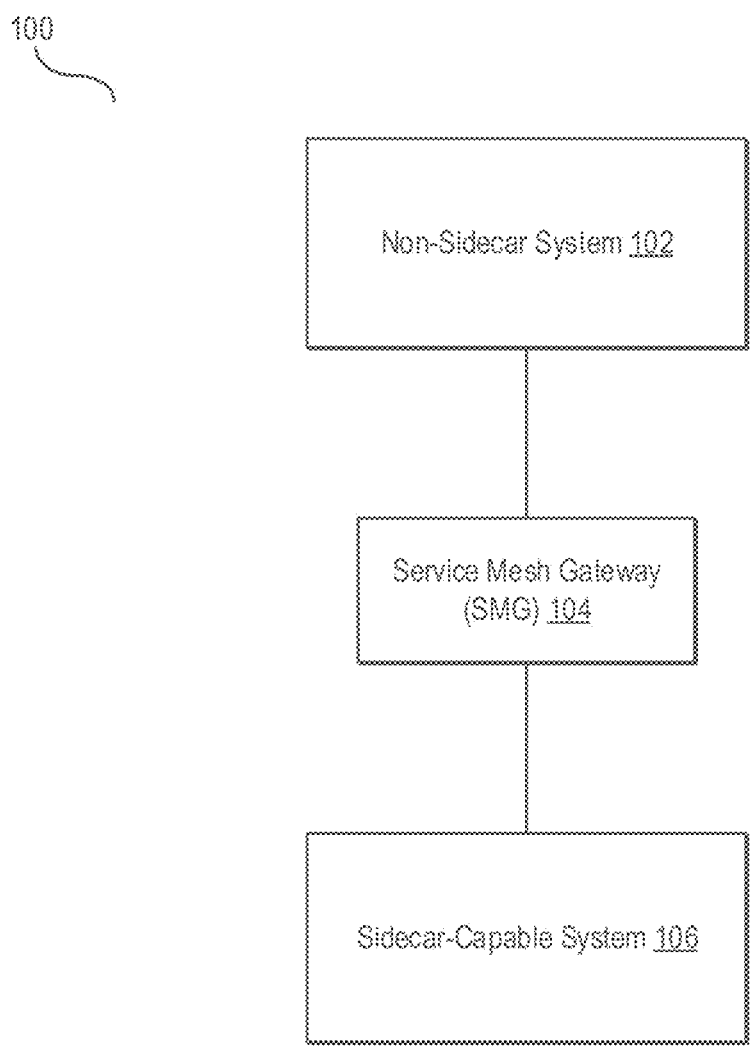
FIG. 1 is a block diagram illustrating a system for providing sidecar proxy injection in a non-sidecar system according to some embodiments.

The example embodiments describe a heterogenous network wherein containerized applications and non-sidecar systems coordinate to provide network services such as cellular core network services.

In the example embodiments, containerized applications are deployed in a service mesh architecture, each containerized application connected to other containerized applications and to a mesh controller through a sidecar proxy. In an embodiment, a sidecar proxy can comprise a proxy application or hardware that extracts certain administrative features (e.g., inter-service communications, monitoring, and security) from the main application and can be automatically injected into a containerized pod executing an application. Thus, the core business logic of the application can be separated from administrative features, allowing for these administrative features to be replicated across pods as well as allowing for the administrative features to be maintained (e.g., updated, augmented, etc.) separately from the core business logic.

In addition to containerized applications, non-sidecar applications (e.g., applications installed on bare metal, virtual machines, or containers that do not support sidecar proxy injection) can also be deployed in conjunction with the containerized applications. In some embodiments, some non-sidecar applications (e.g., virtual machines) may not deployed via container orchestration and as such sidecar proxies cannot natively be injected into an underlying pod. Further, in some embodiments, the non-sidecar applications may also include containerized applications that do not support sidecar proxy injection or do not include sidecar proxies. Such containerized applications and can thus primarily run the main application. For example, one or more containers running under Docker® or another container environment can comprise non-sidecar applications. As such, the example embodiments provide a service mesh gateway (SMG) that manages a pool of proxies associated with non-sidecar applications. This SMG can be deployed between the containerized and non-sidecar facilities and include connections to each. Upon deployment, a bare metal application or virtual machine can be attached to a proxy managed by the SMG which then mimics the behavior of a sidecar proxy injected into a containerized pod. As used herein, "non-sidecar" generally refers to the lack of an ability to support sidecar proxy injection or the lack of an existing sidecar proxy.

In the example embodiments, devices, methods, and computer-readable media are disclosed. In an embodiment, a service mesh gateway (SMG) receives a request to instantiate a proxy for a non-sidecar application. In an embodiment, the SMG can receive the request directly from a non-sidecar application. In other compatible embodiments, the SMG can receive the request from an orchestrator component. In other embodiments, the SMG can receive the request from a virtual machine instance or a bare metal application. Further, in some embodiments, the containerized environment can execute a plurality of pods, each pod including an application and a corresponding proxy itself.

In response to the instantiation request, the SMG can instantiate the proxy, wherein the proxy can be configured to monitor data communications to and from the non-sidecar application. In some scenarios, the SMG can determine a plurality of network configuration parameters of the proxy based on at least one pre-configured policy.

The SMG can then broadcast network information of the non-sidecar application to a mesh controller deployed in a containerized environment. In an embodiment, the SMG broadcasts a source parameter, a destination parameter, and a network protocol to the mesh controller. Further, in an embodiment, the SMG receives information associated with a second SMG, the second SMG communicatively coupled to a computing device identified by the destination parameter.

Finally, the SMG (via the proxy) transmits data over a control plane, the control plane communicatively coupled to the proxy and the mesh controller. In some embodiments, the proxy can then perform administrative functions such as firewalling, address translation, logging, encryption, and decryption operations.

FIG. 1 is a block diagram illustrating a system 100 for providing sidecar proxy injection in a non-sidecar system according to some embodiments.

In the system 100, a non-sidecar system 102 is communicatively coupled to a sidecar-capable system 106 via SMG 104. In an embodiment, sidecar-capable system 106 can comprise one or more containers and associated management and orchestration software to manage the lifecycle of such containers. In general, containerization comprises the packaging of software code with operating system (OS) libraries and dependencies required to run the code to create a single lightweight executable (i.e., a container) that runs consistently on any infrastructure. In an embodiment, containers can be grouped into pods. In an embodiment, a pod can comprise a group of one or more containers, with shared storage and network resources, and a specification for how to run the containers. In an embodiment, a pod's contents can be co-located and co-scheduled, and run in a shared context. In an embodiment, a pod can model an application-specific logical host. That is, a pod can contain one or more application containers which are relatively tightly coupled.

In an embodiment, the sidecar-capable system 106 can implement a service mesh. Examples of existing service mesh systems include Istio® by Google, Inc. of Mountain View, Calif. and Consul® by HashiCorp of San Francisco, Calif. In an embodiment, a service mesh refers to a platform layer on top of the infrastructure layer that enables managed, observable, and secure communication between individual services or containers. In an embodiment, the service mesh can use consistent tools to factor out all the common concerns of running a service, like monitoring, networking, and security. In an embodiment, the service mesh is transparent to the underlying application code running in containers. In an embodiment, a service mesh controller (or simply, mesh controller) monitors all traffic through proxies attached to the containerized applications. In an embodiment, the proxy and one or more containers can be combined in a pod. As used herein a "sidecar proxy" refers to a proxy communicatively coupled to application logic and not integrated within the application logic. Envoy® by The Linux Foundation of San Francisco, Calif. is one example of a sidecar proxy used in service mesh architectures.

Each proxy communicates with other proxies, using a control plane (e.g., for messaging on system configurations) and a user plane or data plane (e.g., for service requests and responses). User plan and data plane are used interchangeably herein. A service mesh can allow for security measures to be applied on a system-wide basis (e.g., encryption, admission control) without having to implement those measures in the individual containerized services. It is also useful to allow for dynamic control of deployed services and monitoring or logging of activities (e.g., through the mesh controller). One example of a sidecar-capable system is provided in FIG. 2 and reference is made to the description of that figure for further examples of a sidecar-capable system.

In an embodiment, non-sidecar system 102 can comprise any computer network executing one or more applications. In an embodiment, non-sidecar system 102 can comprise a cloud computing facility that includes a plurality of physical computing devices (e.g., servers) and networking hardware (e.g., routers, switches, etc.) to enable an operator to deploy cloud native services to the physical hardware. In an embodiment, non-sidecar system 102 can comprise one or more computing devices executing non-sidecar software. As used herein, non-sidecar software refers to any software executing without a corresponding isolated user space instance (i.e., container) such as a Docker®, Linux Containers (LXC), rkt, or similar container. As illustrated and discussed in more detail in the description of FIG. 3, non-sidecar system 102 can include management and orchestration components to facilitate the deployment of applications on the underlying physical hardware of non-sidecar system 102. In an embodiment, an operator can deploy applications directly onto the underlying physical hardware. In some embodiments, the non-sidecar system 102 can include a plurality of virtual or physical hosts, including bare metal hosts, virtual machine hosts, container hosts, etc., as described in more detail below. An application that is running directly on the physical hardware (including in an operating system) is referred to as a "bare metal" application. By contrast, in some embodiments, non-sidecar system 102 can include one or more virtual machines executing on the computing devices. In such an embodiment, the management and orchestration components can able automatic deployment and scaling of physical hardware to meet the demands of applications. In such an environment, applications can be packaged as virtual machine (VM) images and deployed to the physical hardware. Examples of cloud computing infrastructure systems include Amazon Web Services® by Amazon, Inc. of Seattle, Wash. and Google Compute Platform® by Google, Inc. of Mountain View, Calif. In some embodiments, the cloud computing infrastructure can be run independently and not rely on commercial cloud computing platforms and thus the preceding platforms are exemplary only. Indeed, in some embodiments, a network operator may maintain both the physical infrastructure of non-sidecar system 102, the cloud platform services and software (e.g., OpenStack® by the OpenStack Foundation of Austin, Tex.) as well as the application software.

In existing systems, applications running in non-sidecar system 102 cannot easily communicate with the service mesh of sidecar-capable system 106. Since communications in sidecar-capable system 106 are facilitated with sidecar proxies, and such sidecar proxies are containerized, applications in non-sidecar system 102 cannot avail themselves of the sidecar proxy functionality. In some scenarios, individual applications in non-sidecar system 102 can be manually modified to communicate with the service mesh of sidecar-capable system 106. However, this approach is not scalable for large-scale data centers as each individual application would require modification. Further, in some deployment scenarios, individual applications may not be capable of being modified. For example, in a cellular network, existing infrastructure may not be capable of being modified and still maintain standards compliance. Further, in some embodiments, modification of applications in non-sidecar system 102 may not be feasible due to regulatory requirements.

To remedy these, and other, deficiencies, the system 100 includes an SMG 104 that facilitates communications between non-sidecar system 102 and sidecar-capable system 106. Although only one SMG 104 is illustrated, the system 100 may indeed include multiple SMGs. In an embodiment, SMG 104 is associated with a logical region of a network. For example, each data center in a network may be associated with its own SMG. In some embodiments, the distribution of SMGs may be more granular. For example, a separate SMG can be associated with each rack of servers in a data center. Various other configurations are possible. In some embodiments, SMGs may be deployed in a hierarchical manner or in a flat architecture, connecting the non-sidecar system 102 to the sidecar-capable system 106.

In the embodiments, the SMG 104 can integrate non-sidecar services in non-sidecar system 102 into sidecar-capable system 106. As such, the SMG 104 includes network connections with both non-sidecar system 102 and sidecar-capable system 106. In an embodiment, the SMG 104 can be part of the non-sidecar system 102. That is, the hardware and/or software of the SMG 104 can be integrated into the non-sidecar system 102. In an embodiment, the SMG 104 implements one or more proxies, which are each connected to services implemented in VMs of the non-sidecar system 102. The SMG 104 is also connected to the sidecar-capable system 106 (and the service mesh controller), allowing the proxies managed by the SMG 104 to participate in control plane messaging with the mesh controller and data plane communications with other proxies (e.g., connected to applications in sidecar-capable system 106). In the example system, the SMG 104 can provide administrative functions (as described above) to the services of the non-sidecar system 102.

In an embodiment, the SMG 104 can be implemented as a separate facility connected to the non-sidecar system 102 and the sidecar-capable system 106. In some embodiments, the SMG 104 can be implemented as part of a server device in the non-sidecar system 102, as part of a network interface card in the non-sidecar system 102, or a combination of either. In some embodiments, the SMG 104 can be implemented as a software executable or application. In some embodiments, the software executable or application implementing the SMG 104 can be deployed to a system-on-a-chip (SoC) of a network device. In an embodiment, the SoC can be integrated into a smart network interface card (SmartNIC) or similar network interface processing element. Other deployments options may be utilized, and the above example should not limit the disclosure.

The SMG 104 may have one or more ports connected to the non-sidecar system 102 such that communications can be sent/received between each VM hosting a service in the non-sidecar system 102, such as through a virtual LAN (VLAN) or virtual extensible LAN (VXLAN) setup between the VMs and the server. The server may also include one or more ports that are connected to the sidecar-capable system 106, such as through a "trunk" line or other communications link. Further details of the SMG 104 are provided herein.

Figure 2:
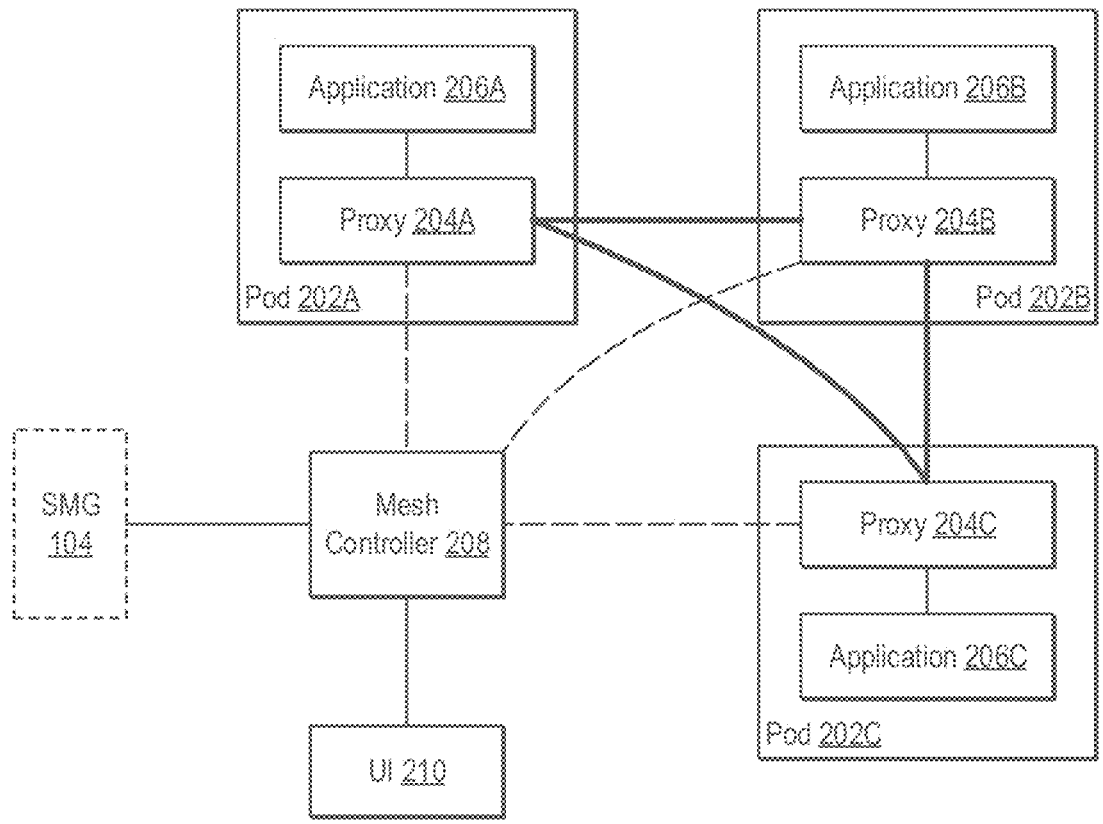
FIG. 2 is a block diagram illustrating a containerized system employing sidecar proxies according to some embodiments.

FIG. 2 is a block diagram illustrating a sidecar-capable system 200 employing sidecar proxies according to some embodiments. In an embodiment, the sidecar-capable system 200 can be used as sidecar-capable system 106 in FIG. 1.

In the sidecar-capable system 200, a plurality of pods (e.g., pods 202A, 202B, 202C) are communicatively coupled to each other via sidecar proxies (e.g., proxy 204A, proxy 204B, proxy 204C). In some embodiments, the proxies 204A-204C can comprise full stack network proxies configured to monitor traffic at various network levels. For example, the proxies 204A-204C can be configured to monitor traffic between Layers 2 and 7 of an Open Systems Interconnection (OSI) model network stack. Thus, while some proxies may be configured to only inspect traffic above Layer 4, the proxies 204A-204C can specifically be orchestrated to inspect traffic below Layer 4 and, specifically, Layers 2 and 3 of an OSI model network.

The sidecar proxies communicate via a data plane (DP), indicated by the thick line connections. Each of the pods includes an application (e.g., application 206A, application 206B, application 206C) executing the core business logic of an application, service, or a micro-service. As illustrated, the sidecar proxies additionally communicate with a mesh controller 208 via a control plane (CP) indicated by the dashed line connections. The mesh controller 208 is communicatively coupled to the SMG 104 and provides an external user interface 210.

Each of the pods executes at least one application, such as applications 206A, 206B, 206C. As discussed, a given pod can execute multiple applications. In an embodiment, each of the applications 206A, 206B, 206C can comprise a containerized application deployed along with other applications in a single pod (e.g., pod 202A).

As illustrated, each of the pods 202A, 202B, 202C includes a corresponding proxy (e.g., proxies 204A, 204B, 204C). The proxies 204A, 204B, 204C can comprise sidecar proxies injected into a given pod. In an embodiment, the proxies 204A, 204B, 204C can be injected automatically each time a given pod is deployed. Each of the proxies 204A, 204B, 204C communicates with each other and with a mesh controller 208. In some embodiments, one or more of the proxies 204A, 204B, 204C may include an ingress port for receiving data from external computing devices. In an embodiment, the proxies 204A, 204B, 204C communicate with each other via the DP. As illustrated, each of the applications 206A, 206B, 206C only communicate with its associated proxy and does not communicate directly with other applications 206A, 206B, 206C or the network itself. As such, all networking and control function is delegated to the proxies 204A, 204B, 204C.

In an embodiment, the proxies 204A, 204B, 204C communicate via the DP to perform functions such as service discovery, health checking, data routing, load balancing, authentication and authorization, and observability. The proxies 204A, 204B, 204C additionally communicate with mesh controller 208 via the CP to perform non-data operations. In an embodiment, the proxies 204A, 204B, 204C communicate via the CP with the mesh controller 208 to perform functions such as deployment, settings updates, route table specification, load balancing setting updates, proxy configuration, logging, security configurations, etc.

In the illustrated embodiment, an operator can interact with the mesh controller 208 via external user interface 210. The external user interface 210 can comprise a standalone application accessing an application programming interface (API) of the mesh controller 208, a web-based interface, a command line interface (CLI), or another type of interface. Via the external user interface 210, the operator can issue commands to the service mesh and control and manage the operation of the sidecar-capable system 200. The external user interface 210 can be used by humans or machines as a way to manage and configure the mesh controller 208. The external user interface 210 can also be used to issue commands to the mesh controller 208, that can then be used by the mesh controller 208 to perform control plane operations with one or more of the proxies 204A, 204B, 204C.

As illustrated, the mesh controller 208 can additionally receive data from SMG 104. As discussed, the SMG 104 can include a plurality of proxies communicatively coupled to applications in a non-sidecar system 102. Thus, the SMG 104 can facilitate communications between the non-sidecar system 102 and the mesh controller 208, as discussed in more detail in the following Figure.

Figure 3:
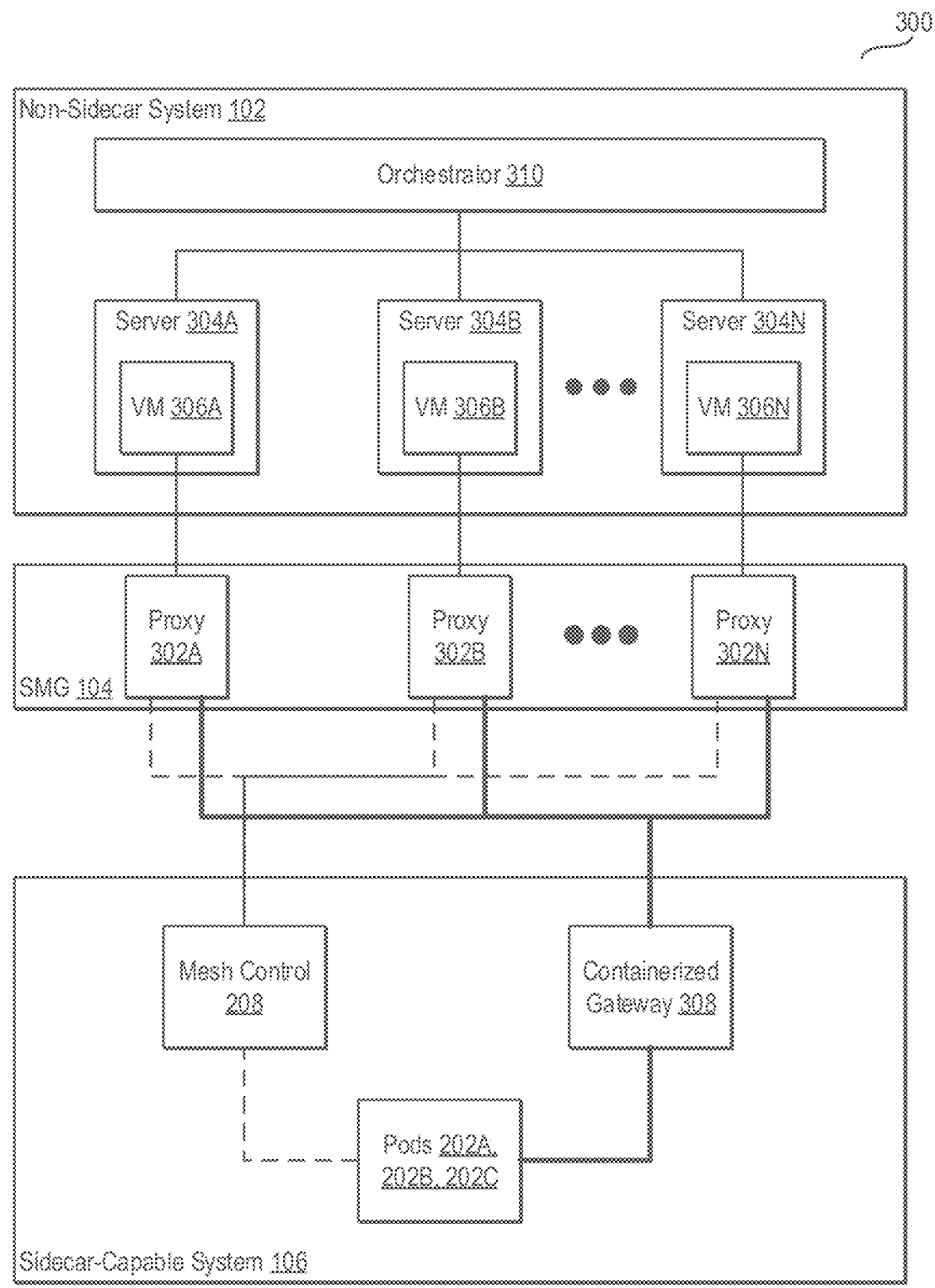
FIG. 3 is a block diagram illustrating a system for providing sidecar proxy injection in a non-sidecar system according to some embodiments.

FIG. 3 is a block diagram illustrating a system 300 for providing sidecar proxy injection in a non-sidecar system according to some embodiments.

In an embodiment, a non-sidecar system 102 includes an orchestrator 310 and a plurality of servers 304A-304N. The plurality of servers 304A-304N execute a plurality of VMs 306A-306N. The specific number of servers and VMs are not limiting. Further, a given server can execute more than one VM. In an embodiment, each VM can execute one or more network services in a virtualized environment. In an embodiment, the orchestrator 310 can manage the deployment of VMs to the servers 304A-304N. In an embodiment, the orchestrator 310 automates the management, coordination and organization of servers 304A-304N, VMs 306A-306N, and other components of non-sidecar system 102.

In an embodiment, an SMG 104 is communicatively situated between the non-sidecar system 102 and sidecar-capable system 106. The SMG 104 includes a plurality of proxies 302A-302N. In an embodiment, each VM 306A-306N is communicatively coupled to a corresponding proxy 302A-302N. Certainly, in some embodiments, a VM need not be associated with a proxy. In an embodiment, the SMG 104 provides an API to enable the creation, modification, and destruction of proxies. In an embodiment, orchestrator 310 calls the API of the SMG 104 to create, modify, and delete proxies for VMs 306A-306N. In an embodiment, the orchestrator 310 is configured to call the API each time a VM is deployed in the non-sidecar system 102. In this manner, every VM instance can be automatically associated with a proxy. In an embodiment, upon initializing a proxy, the SMG 104 can initialize the network and other configuration of the new proxy, as discussed further herein. Further, the orchestrator 310 can configure the VM to forward all network communications to the new proxy associated with the VM.

In one embodiment, the API of the SMG 104 can allow the calling device (e.g., orchestrator 310) to bind VMs to proxies via network addresses or virtual network tags. In one embodiment, when calling a creation API endpoint, the calling part can provide various parameters to configure the proxy. In an embodiment, the parameters can include a VLAN identifier which identifies the VM, a proxy type (e.g., a commercial off-the-shelf proxy object such as an Envoy® proxy), a control plane technology (e.g., a commercial off-the-shelf control plane such as Istio® or Kuma®), a control plane identifier (e.g., the unique identifier of a specific control plane), a pod identifier (e.g., name, namespace, sub-name, version, etc.), a port list (e.g., outbound transmission control protocol or user datagram protocol port numbers), a list of service labels, and security parameters such as mutual transport layer security (mTLS), Datagram TLS (DTLS), Internet Protocol Security (IPsec), VLAN, VXLAN, Generic Network Virtualization Encapsulation (GENEVE) configuration parameters. Relatedly, the API can include a delete endpoint allowing for the detaching and removal of proxies when no longer needed. In one embodiment, the creation API can return a proxy identifier that can be used to later destroy a proxy. In another embodiment, the delete endpoint can accept a VLAN identifier and remove all proxies connected only to the corresponding VM. In such an embodiment, the SMG 104 can confirm that the proxy is only connected to removed VM prior to removing the VM.

As described, in an embodiment, the API of the SMG 104 includes information sourced from all/or both orchestration domains, which allows the instantiated proxies to effectively communicate between networks. For example, the orchestrator 310 for the non-sidecar system 102 may be the source of information for the interface with a VM (e.g., VLAN/VXLAN identifiers that link a VM to the proxy and the ports that are valid for VM communications). A separate orchestrator for the sidecar-capable system 106 may be the source of information for the interface with the containerized cluster, such as the proxy types that can be used, the service meshes that are available (and how connect to their control planes), used/available pod identifiers (to prevent conflicts), security configurations to use for links to the cluster, and the service labels that have been defined for use by services available in the sidecar-capable system 106. Other information could also be used in other implementations.

In an embodiment, the orchestration entities in each domain may provide their respective source information to allow for the creation of proxies. For example, each orchestration entity may expose an interface (e.g., a data bus) that makes the source information available (e.g., to those systems that subscribe to receive notifications for the information). In an embodiment, the SMG 104 subscribes to the source information it needs from each orchestration entity and maintains a local copy of the information in a database which can be used when creating/deleting proxy instances. In such an embodiment, the orchestration entities do not need to be modified to work with the SMG 104. That is, when the SMG 104 is notified of the creation of a VM, the SMG 104 can instantiate a proxy using the source information from each orchestration entity, and likewise when the SMG 104 is notified of the termination of a VM, it can delete its linked proxy instance. In other embodiments, the orchestration entities may include additional capabilities to directly interact with SMG 104, such as allowing the orchestration entity for the non-sidecar system 102 to request proxy creation by the SMG 104 when a VM is launched. In an embodiment, this capability can be implemented using an API exposed to the orchestration entities that allows for requests to be made and associated information to be provided.

In an embodiment, when a proxy is added, the proxy uses a communications link with the sidecar-capable system 106 that uses a security configuration supported by the network (e.g., mutual TLS, IPSec, etc). In an embodiment, the proxy advertises itself to the sidecar-capable system 106 using its assigned information (e.g., its service label), such that the other services executing in other containers can now interact with the proxy (and the VM it is linked to).

In an embodiment, the non-sidecar system 102 can organize servers in individual racks. In such an embodiment, a switch that serves all servers in the rack (sometimes referred to as a "Top of Rack" or TOR switch) can be used to connect to the SMG 104, such that all traffic from the rack servers can be received by the SMG 104. This embodiment allows the SMG 104 to "see" network traffic from each VM in the rack. In some embodiments, the SMG 104 can promiscuously monitor all network traffic and detect traffic that is directed to the proxies implemented in the facility. Such traffic can then be processed by the proxy prior to transmission towards the destination. In an embodiment, media access control (MAC) Address, Internet Protocol (IP) address, VLAN, or VXLAN bindings can be used to map specific VMs to proxies running on the SMG 104. The proxies 302A-302N may include capabilities to communicate with the service mesh via encryption/decryption, tunneling, etc. In some embodiments, the proxies 302A-302N can comprise full stack network proxies configured to monitor traffic at various network levels. For example, the proxies 302A-302N can be configured to monitor traffic between Layers 2 and 7 of an OSI model network stack. Thus, while some proxies may be configured to only inspect traffic above Layer 4, the proxies 302A-302N can specifically be orchestrated to inspect traffic below Layer 4 and, specifically, Layers 2 and 3 of an OSI model network.

In an embodiment, each of the proxies 302A-302N communicate with a mesh controller 208 and a containerized gateway 308 in the sidecar-capable system 106. As illustrated, the proxies 302A-302N communicate with the mesh controller 208 via a control plane (indicated with dashed lines) and with the containerized gateway 308 via a data plane (indicated with solid lines). In some embodiments, all communications (both control and data) can pass through containerized gateway 308. In one embodiment, containerized gateway 308 can perform firewall, network address translation, and similar operations for the sidecar-capable system 106. In some embodiments, containerized gateway 308 can be optional, and in such an embodiment, devices in the non-sidecar system 102 can transmit and receive data directly with sidecar-capable system 106.

As discussed above, the control plane type and configuration can be provided by the sidecar-capable system 106 during the proxy initialization. Certainly, in some embodiments, multiple sidecar-capable systems can be deployed, each using their own type of control plane. Thus, in some embodiments, when a proxy is initialized, it is initialized between a VM and a mesh controller in a specific sidecar-capable system 106. If the same proxy is required to communicate with an end point (e.g., pod) in a different sidecar-capable system, a separate proxy can be initialized in the same manner or the existing proxy can be reconfigured using the properties of the different sidecar-capable system. In an embodiment, the containerized gateway 308 can comprise its own pod configured to act as a data ingress port.

Figure 4:
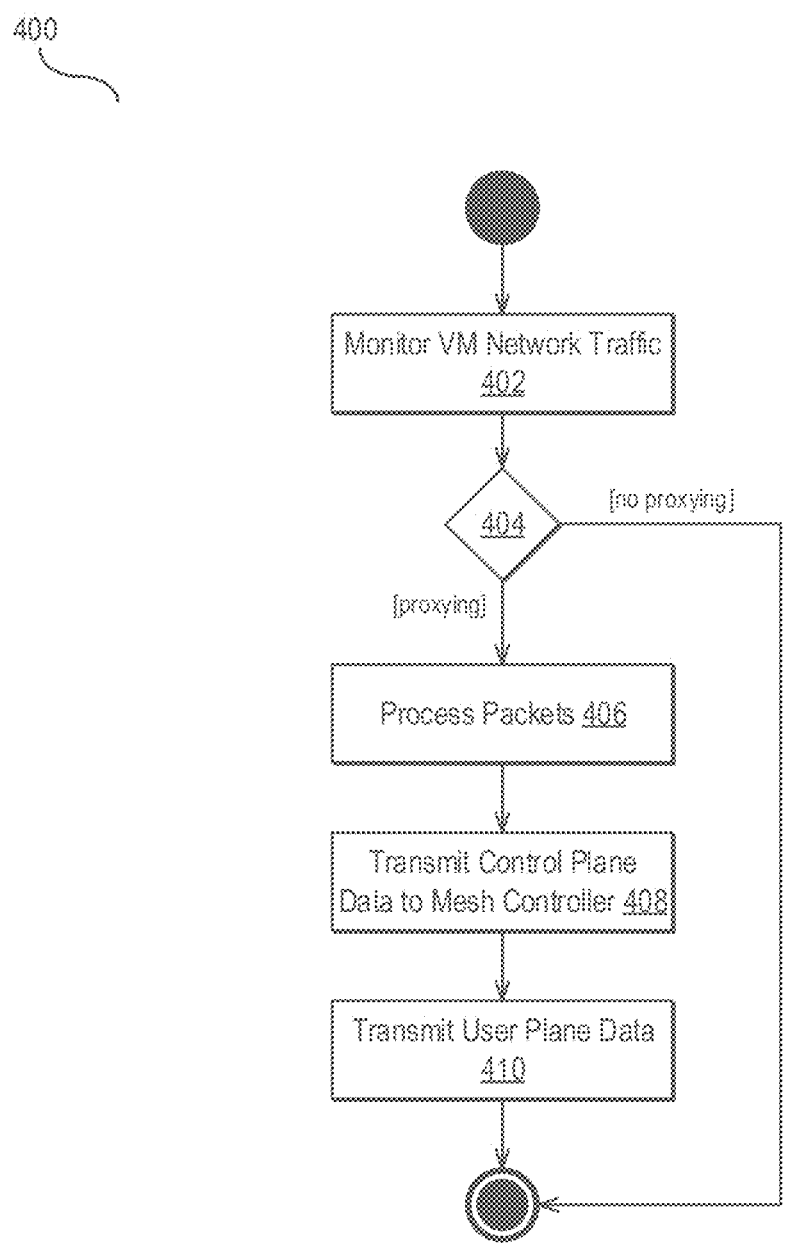
FIG. 4 is a flow diagram illustrating a method for processing data using an injected sidecar proxy according to some embodiments.

FIG. 4 is a flow diagram illustrating a method 400 for processing data using an injected sidecar proxy according to some embodiments. In an embodiment, method 400 can be executed by an SMG such as the SMG 104 described previously.

In step 402, method 400 can comprise monitoring VM network traffic. In an embodiment, the VM is located in a non-sidecar system such as non-sidecar system 102. In an embodiment, method 400 can be operated by a TOR switch and can promiscuously monitor all traffic from VMs running on the servers of the rack containing the TOR switch. In other embodiments, one or more VMs can be configured to transmit data to method 400. For example, in a cloud-based system, a VM instance can be configured to transmit data over a virtual NIC to an SMG executing method 400.

In step 404, method 400 can comprise determining if a proxy is enabled for the VM. In some embodiments, step 404 can be optional. If implemented, method 400 determines if a proxy is configured for a given VM associated with the traffic monitored in step 402. In an embodiment, method 400 can comprise extracting a VM identifier such as a VLAN or VXLAN identifier from the traffic. Method 400 can then determine if a proxy has been instantiated for the VM based on this VM identifier. Methods for instantiating a proxy are described more fully in FIG. 5. In one embodiment, if method 400 determines that no proxy has been instantiated for the VM, method 400 can automatically instantiate a proxy as described in FIG. 5. Alternatively, and as illustrated, in some embodiments, method 400 can simply bypass all proxy-related operations if a VM associated with the network traffic does not have an attached proxy. In step 404, method 400 thus acts as a bump-in-the-wire.

In step 406, method 400 can process packets using the proxy.

Details of processing packets via a proxy have been described previously and are not repeated herein. In one embodiment, method 400 can process packets by performing security operations on the underlying data such as encryption and decryption for outgoing and incoming packets, respectively. In an embodiment, method 400 can perform mTLS encryption and decryption on the packet (as well as other packets). While mTLS is used as an example, other operations can be performed on the packet. For example, method 400 can apply one or more network policies to the packets. Examples of network policies include denying or allowing egress/ingress traffic for a given VM, enabling or disabling Stream Control Transmission Protocol (SCTP) processing for a packet, broadcasting packets to multiple destination ports, targeting namespace destinations by name, perform protocol conversions, among others.

In general, the processing in step 406 can be any necessary processing to enable the receipt of data at a destination. Notably, as will be discussed, the processing in step 406 can comprise only processing on data (versus control) plane packets. Thus, the disclosure does not limit the types of processing performed on data packets transmitted to a destination over a data plane.

In step 408, method 400 can comprise transmitting control plane data to the mesh controller.

In contrast to data transmitted over the data plane to endpoints, the control plane data comprises service mesh control plane data transmitted over a control plane to a service mesh controller. As described previously, a service mesh control plane at its heart is a desired state server that can be used to control a proxy's behavior across the service mesh. The control plane is where an operator can specify authentication policies, gather metrics and configure the data plane (i.e., the mesh of proxies) as a whole. As such, in step 408, method 400 can transmit metrics and logging data to the mesh controller as well as report other statistics to the mesh controller. Method 400 can additionally broadcast or advertise metadata describing the proxy and, if applicable, the attached VM. Method 400 can additionally transmit health data of the proxy and VM including data such as traffic volumes, error counts, packets dropped, etc.

In step 410, method 400 can comprise transmitting user plane data over a user or data plane to a sidecar-capable system.

In an embodiment, method 400 transmits the user plane data processed in step 408 to the ultimate destination(s). In an embodiment, the destinations(s) can be defined in the proxy configuration during instantiation. As such, method 400 can identify the destinations from the proxy configuration and forward the processed packets to the ultimate destinations accordingly. As described, this transmission is performed using the data plane and can be encrypted via, for example, mTLS. In some embodiments, method 400 can transmit the user plane packets directly to a containerized destination port. In other embodiments, method 400 transmits the processed packets to a gateway of a corresponding containerized facility that includes the destination container. In some embodiments, the destination comprises a pod including the container. In such embodiments, the destination can further include its own sidecar proxy. As such, method 400 can transmit data from a proxy in an SMG to a proxy in a corresponding destination pod. In such an embodiment, the destination proxy can perform the reverse (or same) operations as described in steps 408 and 410. For example, the destination proxy can decrypt data or report metrics to a mesh controller upon receipt of the packet.

Figure 5:
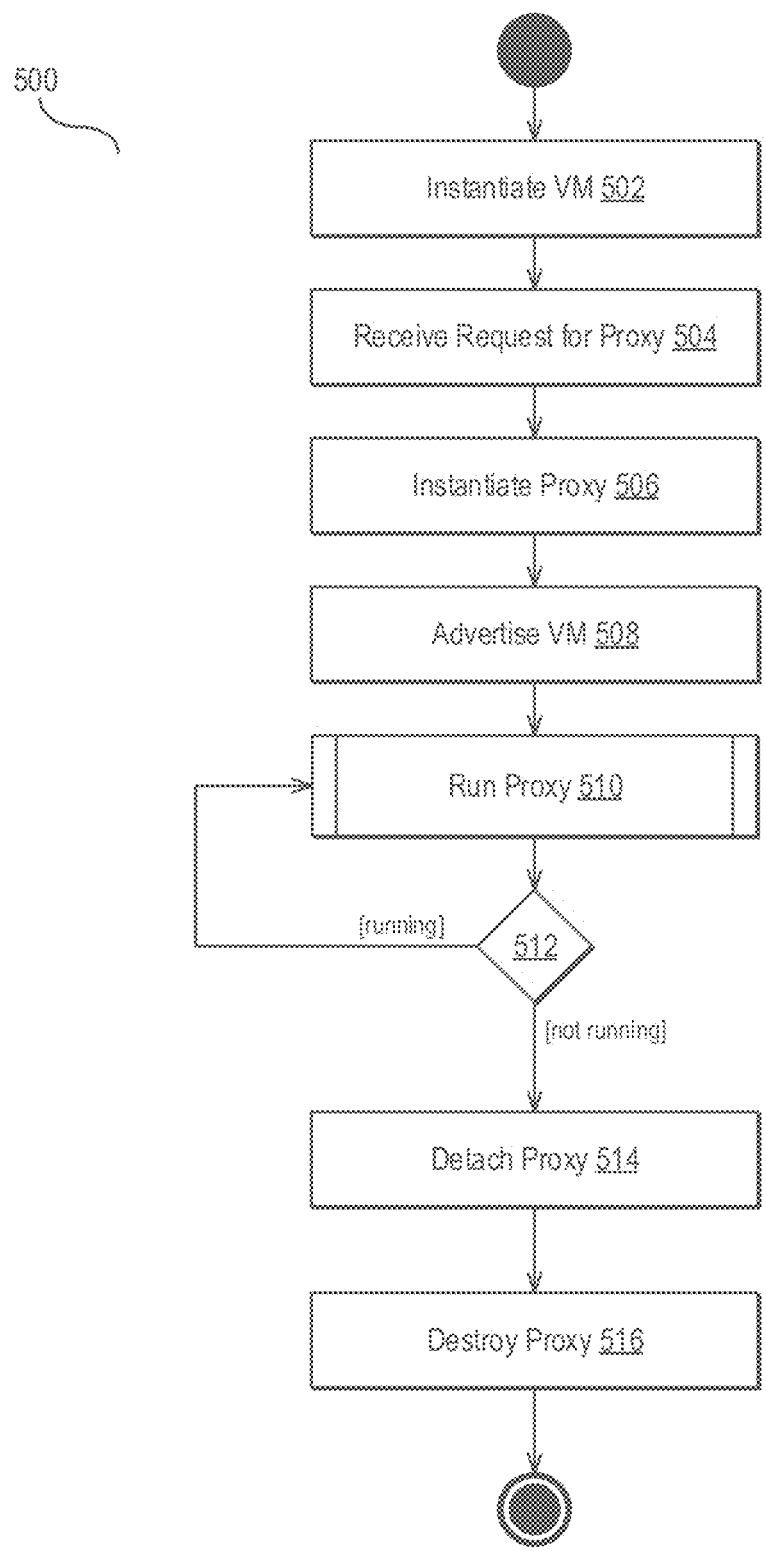
FIG. 5 is a flow diagram illustrating a method for injecting a sidecar proxy into a non-sidecar application according to some embodiments.

FIG. 5 is a flow diagram illustrating a method 500 for injecting a sidecar proxy into a non-sidecar application according to some embodiments.

In step 502, method 500 can comprise instantiating a VM. Although VMs are used as examples, other types of non-sidecar applications (e.g., bare metal applications, containerized applications without sidecar proxies, etc.) can be used in method 500. In an embodiment, method 500 can instantiate a non-sidecar application by issuing an API call to an orchestrator or other similar computing service or device. For example, method 500 can receive a virtual machine image, can configure one or more virtual machines to use the image, and can deploy the image to the one or more virtual machines. Details of instantiating a VM are not provided. It will be recognized that any techniques for instantiating VMs and similar non-sidecar applications can be employed.

In step 504, method 500 receives a request for a proxy. In an embodiment, method 500 receives the request for a proxy via a call for an API. In an embodiment, the API can comprise a Hypertext Transfer Protocol (HTTP) endpoint. In an embodiment, the endpoint can comprise a designated uniform resource locator (URL) for calling the API function. In an embodiment, the API function can accept one or more parameters describing the requested proxy. In an embodiment, the parameters can include a VLAN identifier which identifies the VM, a proxy type (e.g., a commercial off-the-shelf proxy object such as an Envoy® proxy), a control plane technology (e.g., a commercial off-the-shelf control plane such as Istio® or Kuma®), a control plane identifier (e.g., the unique identifier of a specific control plane), a pod identifier (e.g., name, namespace, sub-name, version, etc.), a port list (e.g., outbound transmission control protocol or user datagram protocol port numbers), a list of service labels, and security parameters such as mTLS, IPsec, VLAN, VXLAN, GENEVE configuration parameters.

In an embodiment, method 500 can comprise receiving an out-of-band request for a proxy. In such a scenario, method 500 can receive the request for the proxy independent of the instantiation of the VM in step 502. For example, method 500 can execute step 502 independently can then proceed to step 504 in response to an explicit request (e.g., from a network operator).

In another embodiment, method 500 can comprise receiving the request for the proxy automatically when a VM is instantiated in step 502. For example, in one embodiment, an orchestrator receiving requests to instantiate VMs can be configured to automatically call the API to request a proxy for all new VMs. In some embodiments, method 500 can receive an indication that a proxy should be requested in a command to instantiate the VM. For example, a command to instantiate the VM can include a set of proxy parameters (discussed above). When instantiating the VM, method 500 can use the parameters to automatically request a proxy.

In step 506, method 500 can comprise instantiating a proxy.

In some embodiments, method 500 instantiates a proxy by creating a sidecar proxy in the SMG. In an embodiment, method 500 can create a sidecar proxy by launching a container running the sidecar proxy software. In an embodiment, method 500 can identify the sidecar proxy software based on an identification of the specific sidecar proxy software in an API call. In an embodiment, method 500 attaches an ingress port of the sidecar proxy container to the egress of traffic from the identified VM and attaches the egress port of the sidecar proxy container to a destination address. In an embodiment, this destination address can be specified in an API call or similar mechanism.

In an embodiment, method 500 can instantiate a new proxy container within the SMG. In another embodiment, method 500 can identify an unattached proxy in the SMG and attach the unattached proxy to the VM. In another embodiment, the method 500 can instantiate a new proxy container outside of the SMG and running on a different compute hardware and software that is managed by the SMG.

In step 508, method 500 can comprise advertising the VM. In an embodiment, method 500 can advertise the VM by transmitting details of the VM and/or proxy to a service mesh controller. In an embodiment, method 500 can advertise the VM by transmitting details of the VM and/or proxy to a service registry, database, or similar centralized repository. In an embodiment, method 500 can advertise the VM by transmitting details of the VM or proxy such as a fully qualified domain name (FQDN) of the VM, the FQDN of the destination, a protocol to use, and security parameters.

In step 510, method 500 can comprise running the proxy. Details of the execution of the proxy are provided in the description of FIG. 4 and not repeated herein.

In step 512, method 500 can comprise determining if the VM is still running. In one embodiment, method 500 can query the orchestrator or another statistics component to determine whether a VM is still running. In other embodiments, a VM can affirmatively inform method 500 that it is not running (e.g., is being terminated or suspended). If the VM is still running, method 500 continues to execute step 510 for the lifetime of the VM. In some embodiments, method 500 can alternatively determine in step 512 if a request to detach a proxy for the VM has been issued.

In step 514, method 500 can comprise detaching the proxy from the VM. In an embodiment, method 500 can detach a proxy by disabling the interception of communications from the VM. In such embodiments, method 500 can re-enable the normal transmission of content by the VM. In one embodiment, method 500 can further release the proxy to a pool of available proxy objects stored in memory to allow for quicker attachment of proxies to VMs.

In step 516, method 500 can comprise destroying the proxy object after detaching it. In some embodiments, step 516 can be optional. If implemented, method 500 can remove the proxy object data structure completely from memory, thus destroying the proxy object completely. In some embodiments, any logs or other temporary data can also be removed as part of destroying the proxy object.

Figure 6:
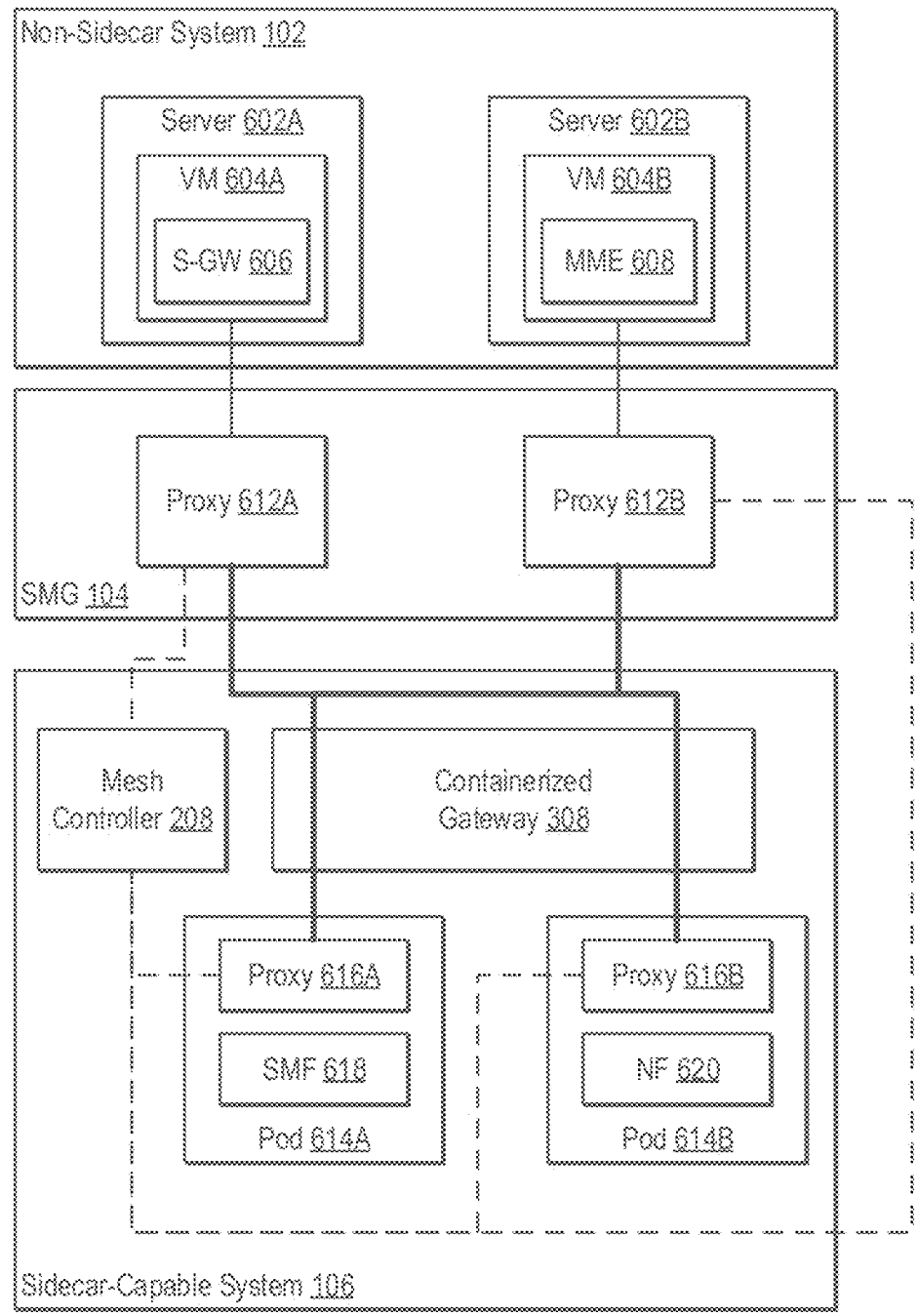
FIG. 6 is a block diagram illustrating a cellular network providing sidecar proxy injection in a non-sidecar system according to some embodiments.

FIG. 6 is a block diagram illustrating a cellular network 600 providing sidecar proxy injection in a non-sidecar system according to some embodiments.

Various elements in FIG. 6 bearing the same reference numerals have been described previously and are not repeated herein. In brief, a non-sidecar system 102 and sidecar-capable system 106 are depicted that implement selected functions of a cellular core network such as a session gateway 606 and mobility management entity 608 in a 4G core network and a session management function 618 and additional network function 620 of a 5G core network. In the illustrated embodiment, the non-sidecar system 102 can be used to deploy and maintain a 4G network while sidecar-capable system 106 can be used to deploy and maintain a 5G network.

In the illustrated embodiment, the session gateway 606 and mobility management entity 608 are implemented in virtual machines 604A, 604B running on servers 602A, 602B, both respectively. An orchestrator (e.g., 310, not illustrated) issues an API call to the SMG 104 to instantiate new proxies 612A, 612B for the session gateway 606 and mobility management entity 608, respectively. These proxies 612A, 612B enable service mesh communications between the session gateway 606 and mobility management entity 608 and the containerized network functions including session management function 618 and additional network function 620. As illustrated, session management function 618 and additional network function 620 are deployed as containerized applications in pods 614A, 614B, respectively. During deployment, the pods 614A, 614B are injected with sidecar proxies 616A, 616B. Thus, all communications between session gateway 606 and mobility management entity 608 are mediated by proxies 612A, 612B in the SMG 104 and sidecar proxies 616A, 616B. Further, the proxies 612A, 612B are communicatively coupled via a control plane (in dashed lines) to the mesh controller and thus can be controlled via a mesh controller user interface (as described in FIG. 2).

In the illustrated embodiment, the session gateway 606 can expose an S5-C interface that may be used by the session management function 618 when coordinating session information in a dual connectivity (DC) 5G network. To allow the session gateway 606 to communicate with a session management function 618 implemented in the sidecar-capable system 106 using a service mesh, a proxy 612A is deployed in the SMG 104 that is associated with the non-sidecar system 102 in which the session gateway 606 is instantiated. The proxy 612A is thus mapped to the session gateway 606, such that the 3GPP-defined S5-C interface traffic is received at the session gateway 606 and visible to the proxy 612A. Traffic to the session management function 618 is encapsulated in the service mesh protocol and encrypted (e.g., using mTLS), and sent to the proxy 616A for the session management function 618. In an embodiment, the proxy 616A de-encapsulates the mTLS message and delivers the S5-C message to the session management function 618.

The specific cellular network components and interfaces above are provided as examples and, in other embodiments, other components and interfaces can be substituted without creative efforts. Notably, in an embodiment, the cellular network 600 depicts a dual connectivity network that often includes both containerized 5G network functions and legacy 4G components. As discussed, in such deployments, adding service mesh capabilities directly to VM instances in a 4G environment may be practically or technologically or financially infeasible. Thus, the illustrated SMG 104 provides for an automated mechanism to join a non-service mesh network to a containerized network implementing a service mesh. Since the proxies in the SMG 104 manage all network functionality, a mesh controller 208 can thus control the network operations of both the sidecar-capable system 106 as well as the non-sidecar system 102.

Figure 7:
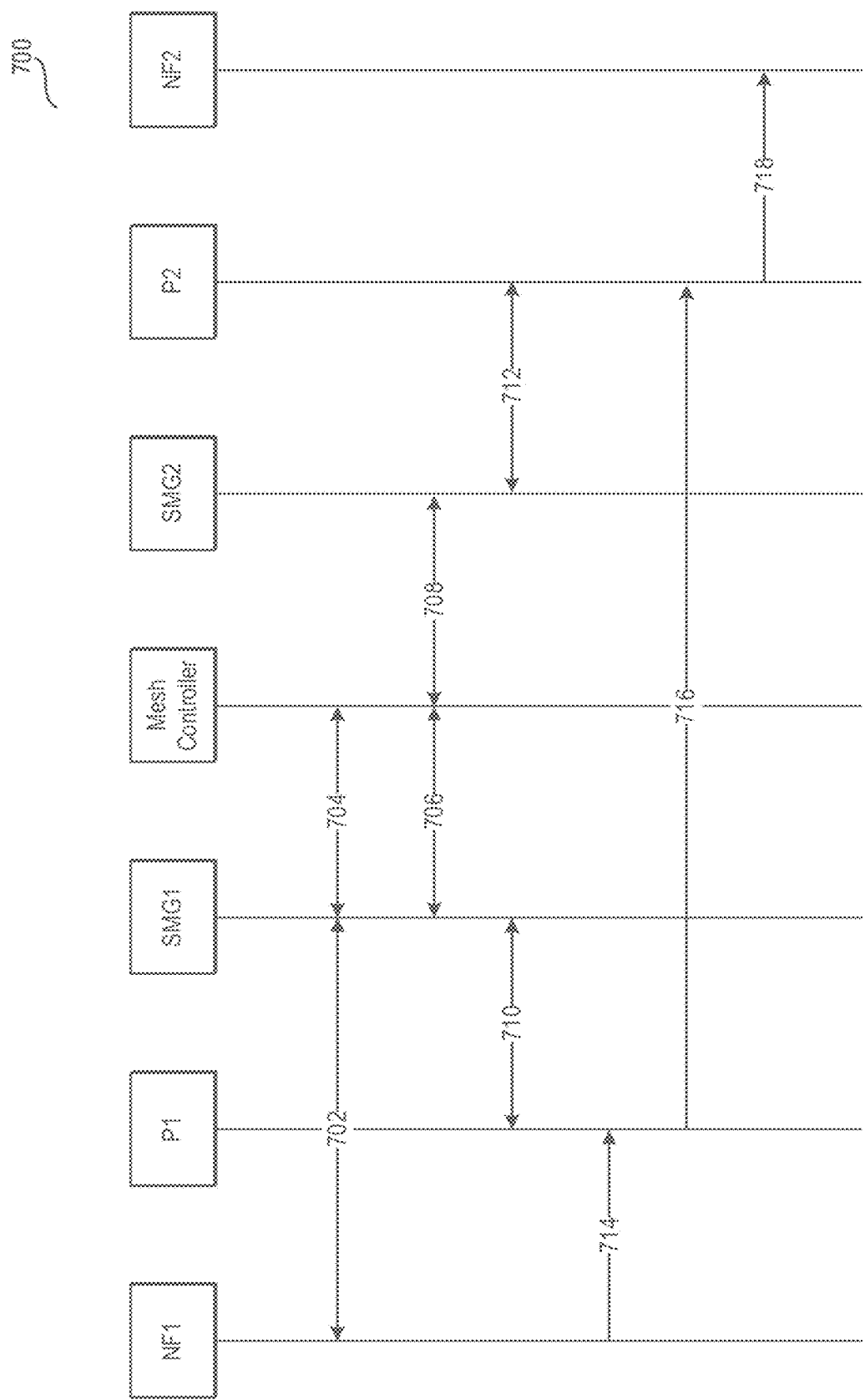
FIG. 7 is a call flow diagram illustrating a method for injecting sidecar proxies in a non-sidecar system according to some embodiments.

FIG. 7 is a call flow diagram illustrating a method 700 for injecting sidecar proxies in a non-sidecar system according to some embodiments.

In step 702, method 700 performing run-time orchestration of a first network function (NF1) with a first SMG (SMG1). In the illustrated embodiment, run-time orchestration can comprise NF1 requesting a proxy-based communications channel with a second network function (NF2). In step 702, NF1 may not include any information regarding the state of NF2, including whether it currently includes its own proxy. As such, step 702 can be performed at any stage of the lifecycle of either NF1 or NF2. In response, in step 704, SMG1 performs a corresponding run-time orchestration with the mesh controller. In an embodiment, SMG1 coordinates directly with a mesh controller to retrieve details regarding NF2. In an embodiment, SMG1 provides details of the NF1 as well as the requested destination to the mesh controller. In response, the mesh controller can store these details and respond with additional details of NF2 (as well as any corresponding proxy details) to the SMG1.

In steps 706 and 708 the mesh controller performs end-to-end protocol-specific orchestration with both the SMG1 and a second SMG (SMG2) associated with a destination endpoint, respectively. In an embodiment, the mesh controller can then provide all protocol information to both SMG1 and SMG2 to enable each individual proxy/network function to configure a secure communications channel. In some embodiments, mesh controller can provide error or feedback information to either SMG if an invalid protocol state is requested or detected.

After performing the dynamic orchestration in steps 702 through 708, SMG1 instantiates a first proxy (P1) in step 710 while SMG2 instantiates a first proxy (P2) in step 712. Details of steps 710 and 712 were provided in the description of step 506 of FIG. 5 and are not repeated herein. After step 712, both NF1 and NF2 are configured with corresponding proxies P1 and P2, respectively.

After step 712, when NF1 communicates with NF2, it transmits a service request to P1 (step 714). 4 In response, P1 facilitates data and control plane transmissions including transmitting the service request data to P2 over a data plane (step 716). Upon receipt of the data from P1, P2 forwards the service request (subject to processing) to NF2 in step 718. Details of processing services requests were described in the description of FIG. 4 and are not repeated herein.

Figure 8:
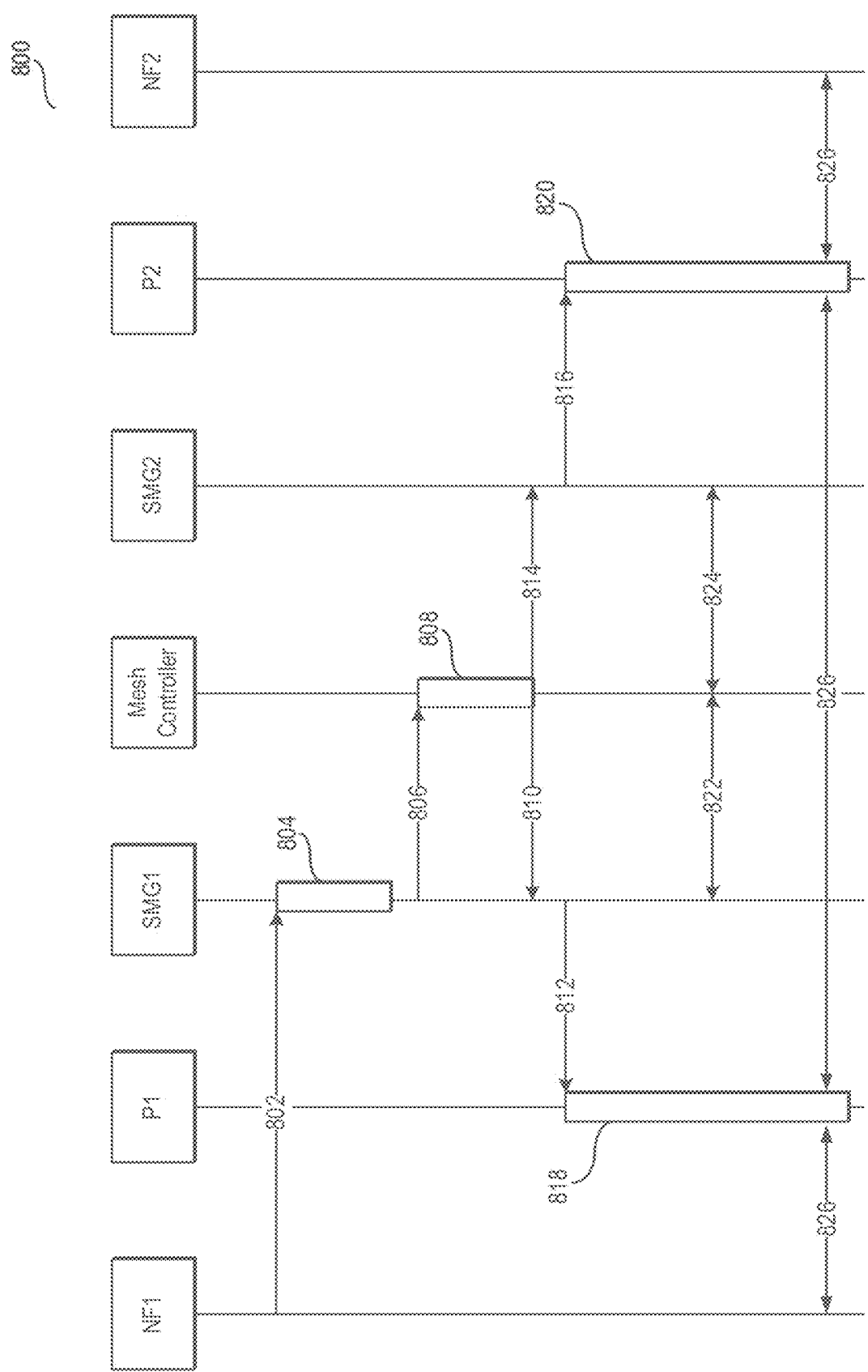
FIG. 8 is a call flow diagram illustrating a method for injecting sidecar proxies in a non-sidecar system according to some embodiments.

FIG. 8 is a call flow diagram illustrating a method 800 for injecting sidecar proxies in a non-sidecar system according to some embodiments.

In an embodiment, a first network function (NF1) issues a service request to a first SMG (SMG1) in step 802 intended for NF2. In an embodiment, the service request can comprise any network request to a destination address. As such, in an embodiment, the service request can include a protocol (e.g., UDP, TCP, etc.) and a destination parameter (e.g., an IP address, FQDN, etc.). In an embodiment, the service request can comprise an arbitrary request. In an embodiment, the service request can comprise a request to establish a proxy to establish a connection with the destination.

In step 804, in response to the service request, the SMG1 determines the parameters of the connection based on one or more network policies. In an embodiment, the network policies may define the proxy-related parameters of the connection. For example, in an embodiment, the SMG1 can determine if NF1 is already configured with a proxy (e.g., P1). If so, the SMG1 can bypass establishing a proxy. If not, the SMG1 can instantiate a proxy for NF1. Additionally, in an embodiment, SMG1 can determine the network level parameters of the connection such as security protocols (e.g., mTLS, TLS, IPSec) and data protocols (e.g., UDP, TCP, etc.). In one embodiment, these parameters can be defined based on network-level policies and are thus uniform across instances.

In step 806, the SMG1 transmits the parameters of the connection to the mesh controller. In an embodiment, these parameters include the network policy parameters determined in step 804. As such, in some embodiments, these parameters can be set by a sub-network that includes NF1 and SMG1. For example, the parameters can include the network addresses (e.g., IP, FQDN) of NF1 and the destination device (e.g., NF2), a data protocol, and any security protocols or information (e.g., authorization, authentication, security strength, etc.).

In step 808, the mesh controller determines proxy creation details. In an embodiment, the mesh controller can query a service registry or database to obtain information regarding the destination device (e.g., NF2). In an embodiment, the mesh controller uses the network identifier (e.g., IP, FQDN) provided by SMG1 to retrieve details of the destination. In an embodiment, the service registry can return details regarding the destination as well as any proxy information. For example, the service registry can return details of an instantiated proxy or whether no proxy is configured.

Further, in step 808, the mesh controller can determine a destination SMG (e.g., SMG2). In one embodiment, various network functions can be distributed and assigned to different SMGs. As such, the service registry can act as a clearinghouse storing a mapping of destinations (e.g., network functions) to SMGs. In an embodiment, mesh controller can additionally determine network-level security parameters to use when establishing connections between networks (e.g., datagram TLS, DTLS). In an embodiment, the mesh controller can further determine certificate parameters and certificate chains to use to establish the network connections between endpoints.

In steps 810 and 814, the mesh controller transmits messages to the SMG1 and SMG2, respectively. In an embodiment, each message instructs a corresponding SMG to instantiate a proxy (as described in FIG. 5). In an embodiment, the mesh controller provides end-to-end protocol identifications (e.g., to use DTLS), certificate parameters, certificate algorithms to use, a certificate chain, and OAuth token validation parameters.

In steps 812 and 816, SMG1 and SMG2 respectively instantiate new proxies P1 and P2, respectively and the corresponding proxies are initialized and executed in steps 818 and 820, respectively. Reference is made to FIG. 4 for the executing of a proxy. In an embodiment, during the initialization of the proxies, the various network properties can be stored by the proxies. Additionally, in some embodiments, the SMGs can be configured to act as certificate authorities and can receive certificate signing requests (CSRs) from the proxies. The SMGs can, in response, sign the CSRs and return digital certificates to use in, for example, DTLS sessions between NF1 and NF2.

In steps 822 and 824, SMG1 and SMG2, respectively, transmit proxy details to the mesh controller. In one embodiment, the mesh controller associates these proxy details with each destination (e.g., network function). Thus, if a subsequent network function attempts to connect to a network function already attached to a proxy, in these embodiments, mesh controller can bypass step 814 and re-use the existing proxy. Finally, in step 826, NF1 and NF2 communicate over the secure connection as defined by the controllers provided by the mesh controller.

Figure 9:
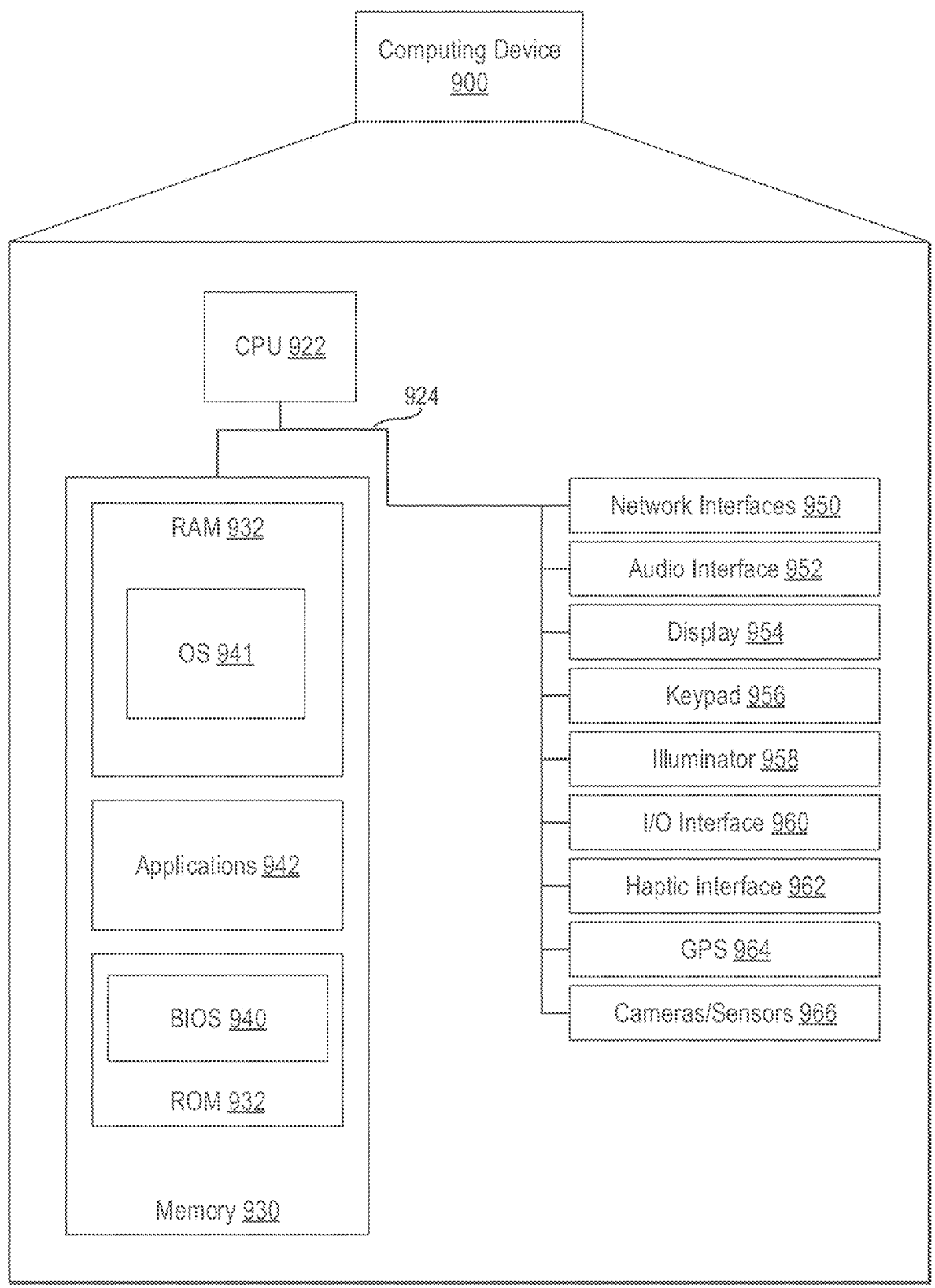
FIG. 9 is a block diagram illustrating a computing device showing an example of a client or server device used in the various embodiments of the disclosure.

FIG. 9 is a block diagram illustrating a computing device showing an example of a client or server device used in the various embodiments of the disclosure.

The computing device 900 may include more or fewer components than those shown in FIG. 9, depending on the deployment or usage of the computing device 900. For example, a server computing device, such as a rack-mounted server, may not include an audio interface 952, display 954, keypad 956, illuminator 958, haptic interface 962, Global Positioning System (GPS) receiver such as GPS receiver 964, or cameras/sensors 966. Some devices may include additional components not shown, such as graphics processing unit (GPU) devices, cryptographic co-processors, artificial intelligence (AI) accelerators, or other peripheral devices.

As shown in the figure, the computing device 900 includes a central processing unit, such as CPU 922, in communication with a mass memory 930 via a bus 924. The computing device 900 also includes a network interface 950, an audio interface 952, a display 954, a keypad 956, an illuminator 958, an input/output interface 960, a haptic interface 962, a GPS receiver 964, and a camera(s) or other optical, thermal, or electromagnetic cameras/sensors 966. The computing device 900 can include a plurality of cameras/sensors 966. The positioning of the cameras/sensors 966 on the computing device 900 can change per computing device 900 model, per computing device 900 capabilities, and the like, or some combination thereof.

In some embodiments, the CPU 922 may comprise a general-purpose CPU. The CPU 922 may comprise a single-core or multiple-core CPU. The CPU 922 may comprise a system-on-a-chip (SoC) or a similar embedded system. In some embodiments, a GPU may be used in place of, or in combination with, a CPU 922. Mass memory 930 may comprise a dynamic random-access memory (DRAM) device, a static random-access memory device (SRAM), or a Flash (e.g., NAND Flash) memory device. In some embodiments, mass memory 930 may comprise a combination of such memory types. In an embodiment, the bus 924 may comprise a Peripheral Component Interconnect Express (PCIe) bus. In some embodiments, bus 924 may comprise multiple busses instead of a single bus.

Mass memory 930 illustrates another example of computer storage media for the storage of information such as computer-readable instructions, data structures, program modules, or other data. Mass memory 930 stores a basic input/output system, BIOS 940, for controlling the low-level operation of the computing device 900. The mass memory also stores an operating system 941 for controlling the operation of the computing device 900

Applications 942 may include computer-executable instructions which, when executed by the computing device 900, perform any of the methods (or portions of the methods) described previously in the description of the preceding Figures. In some embodiments, the software or programs implementing the method embodiments can be read from a hard disk drive (not illustrated) and temporarily stored in RAM 932 by CPU 922. CPU 922 may then read the software or data from RAM 932, process them, and store them in RAM 932 again.

The computing device 900 may optionally communicate with a base station (not shown) or directly with another computing device. Network interface 950 is sometimes known as a transceiver, transceiving device, or network interface card (NIC).

The audio interface 952 produces and receives audio signals such as the sound of a human voice. For example, the audio interface 952 may be coupled to a speaker and microphone (not shown) to enable telecommunication with others or generate an audio acknowledgment for some action. Display 954 may be a liquid crystal display (LCD), gas plasma, light-emitting diode (LED), or any other type of display used with a computing device. Display 954 may also include a touch-sensitive screen arranged to receive input from an object such as a stylus or a digit from a human hand.

Keypad 956 may comprise any input device arranged to receive input from a user. Illuminator 958 may provide a status indication or provide light.

The computing device 900 also comprises an input/output interface 960 for communicating with external devices, using communication technologies, such as USB, infrared, Bluetooth™, or the like. The haptic interface 962 provides tactile feedback to a user of the client device.

The GPS receiver 964 can determine the physical coordinates of the computing device 900 on the surface of the Earth, which typically outputs a location as latitude and longitude values. GPS receiver 964 can also employ other geo-positioning mechanisms, including, but not limited to, triangulation, assisted GPS (AGPS), E-OTD, CI, SAI, ETA, BSS, or the like, to further determine the physical location of the computing device 900 on the surface of the Earth. In an embodiment, however, the computing device 900 may communicate through other components, provide other information that may be employed to determine the physical location of the device, including, for example, a MAC address, IP address, or the like.

The present disclosure has been described with reference to the accompanying drawings, which form a part hereof, and which show, by way of non-limiting illustration, certain example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, the reasonably broad scope for claimed or covered subject matter is intended. Among other things, for example, the subject matter may be embodied as methods, devices, components, or systems. Accordingly, embodiments may, for example, take the form of hardware, software, firmware, or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in some embodiments" as used herein does not necessarily refer to the same embodiment, and the phrase "in another embodiment" as used herein does not necessarily refer to a different embodiment. It is intended, for example, that claimed subject matter includes combinations of example embodiments in whole or in part.

In general, terminology may be understood at least in part from usage in context. For example, certain conjunctive terms (e.g., "or," "and," "and/or") as used herein may include a variety of meanings that may depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein, depending at least in part upon context, may be used to describe any feature, structure, or characteristic in a singular sense or may be used to describe combinations of features, structures, or characteristics in a plural sense. Similarly, terms, such as "a," "an," or "the," again, can be understood to convey a singular usage or to convey a plural usage, depending at least in part upon context. In addition, the term "based on" may be understood as not necessarily intended to convey an exclusive set of factors and may, instead, allow for the existence of additional factors not necessarily expressly described, again, depending at least in part on context.

The present disclosure has been described with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general-purpose computer to alter its function as detailed herein, a special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur in different orders than illustrated. For example, two blocks shown in succession can, in fact, be executed substantially concurrently, or the blocks can sometimes be executed in the reverse order, depending upon the functionality/acts involved.

For the purposes of this disclosure, a non-transitory computer-readable medium (or computer-readable storage medium/media) stores computer data, which data can include computer program code (or computer-executable instructions) that is executable by a computer, in machine-readable form. By way of example, and not limitation, a computer-readable medium may comprise computer-readable storage media for tangible or fixed storage of data or communication media for transient interpretation of code-containing signals. Computer-readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer-readable storage media includes, but is not limited to, RAM, ROM, EPROM, EEPROM, flash memory or other solid-state memory technology, CD-ROM, DVD, or other optical storage, cloud storage, magnetic cassettes, magnetic tape, magnetic disk storage, or other magnetic storage devices, or any other physical or material medium which can be used to tangibly store the desired information or data or instructions and which can be accessed by a computer or processor.

In the preceding specification, various example embodiments have been described with reference to the accompanying drawings. However, it will be evident that various modifications and changes may be made thereto, and additional embodiments may be implemented without departing from the broader scope of the disclosed embodiments as set forth in the claims that follow. The specification and drawings are accordingly to be regarded in an illustrative rather than restrictive sense.

We claim:

1. A method comprising:
    receiving, at a service mesh gateway (SMG), a request from a non-sidecar application to instantiate a proxy for the non-sidecar application, wherein the non-sidecar application is non-containerized and does not natively support sidecar proxy injection and the proxy provides administrative functionality to the non-sidecar application without using sidecar proxy injection;
    instantiating, by the SMG, the proxy in response to the request, the proxy configured to monitor data communications to and from the non-sidecar application;
    broadcasting, by the SMG, network information of the non-sidecar application to a mesh controller deployed in a containerized environment; and
    transmitting, by the SMG, data over a control plane, the control plane communicatively coupled to the proxy and the mesh controller.

2. The method of claim 1, wherein receiving the request to instantiate the proxy comprises receiving the request from one of the non-sidecar application or an orchestrator.

3. The method of claim 1, wherein instantiating the proxy further comprises determining a plurality of network configuration parameters of the proxy based on at least one pre-configured policy.

4. The method of claim 1, wherein broadcasting the network information of the non-sidecar application to the mesh controller comprises transmitting a source parameter, a destination parameter, and a network protocol to the mesh controller.

5. The method of claim 4, further comprising receiving, at the SMG, information associated with a second SMG, the second SMG communicatively coupled to a computing device identified by the destination parameter.

6. The method of claim 1, wherein receiving the request to instantiate a proxy for a non-sidecar application comprises receiving the request from one of a virtual machine instance or bare metal application, and wherein the containerized environment comprises a plurality of pods, each pod in the plurality of pods including an application and a corresponding proxy.

7. The method of claim 1, further comprising performing, by the proxy, administrative functions.

8. A non-transitory computer-readable storage medium for tangibly storing computer program instructions capable of being executed by a computer processor, the computer program instructions defining steps of:
receiving a request from a non-sidecar application to instantiate a proxy for the non-sidecar application, wherein the non-sidecar application is non-containerized and does not natively support sidecar proxy injection and the proxy provides administrative functionality to the non-sidecar application without using sidecar proxy injection;
instantiating the proxy in response to the request, the proxy configured to monitor data communications to and from the non-sidecar application;
broadcasting network information of the non-sidecar application to a mesh controller deployed in a containerized environment; and
transmitting data over a control plane, the control plane communicatively coupled to the proxy and the mesh controller.

9. The non-transitory computer-readable storage medium of claim 8, wherein receiving the request to instantiate the proxy comprises receiving the request from one of the non-sidecar application or an orchestrator.

10. The non-transitory computer-readable storage medium of claim 8, wherein instantiating the proxy further comprises determining a plurality of network configuration parameters of the proxy based on at least one pre-configured policy.

11. The non-transitory computer-readable storage medium of claim 8, wherein broadcasting the network information of the non-sidecar application to the mesh controller comprises transmitting a source parameter, a destination parameter, and a network protocol to the mesh controller.

12. The non-transitory computer-readable storage medium of claim 11, the steps further comprising receiving information associated with a service mesh gateway (SMG), the SMG communicatively coupled to a computing device identified by the destination parameter.

13. The non-transitory computer-readable storage medium of claim 8, wherein receiving the request to instantiate a proxy for a non-sidecar application comprises receiving the request from one of a virtual machine instance or bare metal application, and wherein the containerized environment comprises a plurality of pods, each pod in the plurality of pods including an application and a corresponding proxy.

14. The non-transitory computer-readable storage medium of claim 8, the steps further comprising performing, by the proxy, administrative functions.

15. A device comprising:
a processor configured to:
receive a request from a non-sidecar application to instantiate a proxy for the non-sidecar application, wherein the non-sidecar application is non-containerized and does not natively support sidecar proxy injection and the proxy provides administrative functionality to the non-sidecar application without using sidecar proxy injection;
instantiate the proxy in response to the request, the proxy configured to monitor data communications to and from the non-sidecar application;
broadcast network information of the non-sidecar application to a mesh controller deployed in a containerized environment; and
transmit data over a control plane, the control plane communicatively coupled to the proxy and the mesh controller.

16. The device of claim 15, wherein receiving the request to instantiate the proxy comprises receiving the request from one of the non-sidecar application or an orchestrator.

17. The device of claim 15, wherein instantiating the proxy further comprises determining a plurality of network configuration parameters of the proxy based on at least one pre-configured policy.

18. The device of claim 15, wherein broadcasting the network information of the non-sidecar application to the mesh controller comprises transmitting a source parameter, a destination parameter, and a network protocol to the mesh controller.

19. The device of claim 15, wherein receiving the request to instantiate a proxy for a non-sidecar application comprises receiving the request from one of a virtual machine instance or bare metal application, and wherein the containerized environment comprises a plurality of pods, each pod in the plurality of pods including an application and a corresponding proxy.

20. The device of claim 15, further comprising performing, by the proxy, administrative functions.

* * * * *